US012596532B2

(12) United States Patent
Li et al.

(10) Patent No.: US 12,596,532 B2
(45) Date of Patent: Apr. 7, 2026

(54) WORKFLOW CREATION METHOD AND APPARATUS

(71) Applicant: Siemens Ltd., China, Beijing (CN)

(72) Inventors: Yue Rong Li, Shanghai (CN); Yi Peng Zhu, Nanjing (CN)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 18/840,288

(22) PCT Filed: Feb. 28, 2022

(86) PCT No.: PCT/CN2022/078306
§ 371 (c)(1),
(2) Date: Aug. 21, 2024

(87) PCT Pub. No.: WO2023/159571
PCT Pub. Date: Aug. 31, 2023

(65) Prior Publication Data
US 2025/0181322 A1 Jun. 5, 2025

(51) Int. Cl.
*G06F 8/34* (2018.01)
*G05B 19/05* (2006.01)
*G06Q 10/0633* (2023.01)

(52) U.S. Cl.
CPC ............. *G06F 8/34* (2013.01); *G05B 19/056* (2013.01)

(58) Field of Classification Search
CPC ................................. G06F 8/34; G05B 19/056
See application file for complete search history.

(56) References Cited

U.S. PATENT DOCUMENTS

2019/0086894 A1* 3/2019 Tenorth ................ G05B 19/042
2022/0091824 A1* 3/2022 Schmidt .................... G06F 8/34

FOREIGN PATENT DOCUMENTS

| CN | 113515272 A | 10/2021 |
| EP | 3926422 A1 | 12/2021 |
| JP | 2007125629 A | 5/2007 |

OTHER PUBLICATIONS

NPL ("Behavior Trees in Action: A Study of Robotics Applications", Nov. 2020, Ghzouli et al.) (Year: 2020).*

(Continued)

*Primary Examiner* — Noor Alkhateeb
(74) *Attorney, Agent, or Firm* — Slayden Grubert Beard PLLC

(57) ABSTRACT

Various embodiments of the teachings herein include a workflow creation method. Some examples include: receiving an operation performed by a user on a GUI constructing a functional block model; receiving an operation performed by the user including nesting a behavior tree into a second functional block, wherein the behavior tree defines an operation for a first workcell, and the functional block model defines an operation for a second workcell; in response to a first functional block in the functional block model triggering an input event of the second functional block, then the second functional block triggers an execution signal to a root node in the behavior tree at a preset frequency, so the behavior tree starts execution from the root node and outputs an execution result; the second functional block triggers a corresponding output event according to the execution result; and generating an instance of the functional block model.

4 Claims, 6 Drawing Sheets

(56)     References Cited

OTHER PUBLICATIONS

Embedding Casual Block Diagrams Within Behavior Trees, Bentley Oakes (Year: 2012).*

(Behavior Trees in Action: A Study of Robotics Applications, Nov. 2020, Ghzouli et al.) (Year: 2020).*

Search Report for International Application No. PCT/CN2022/078306, 9 pages, Jul. 29, 2022.

Papazoglou Ioannis A.: "Functional block diagrams and automated construction of event trees"; System Reliability and Industrial Safety Laboratory, Institute of Nuclear Technology—Radiation Protection; received Oct. 4, 1997—accepted Feb. 11, 1998; ISSN: 0951-8320/98.

Gong, Jianxing et al., "Agent Behavior Combination Modeling by Multi-Method Integration", Proceedings of the 5th International Conference on Frontiers of Educational Technologies, pp. 137-142, Jun. 1, 2019.

Extended European Search Report, Application No. 22927852.8, 9 pages, May 6, 2025.

\* cited by examiner

100

WORKFLOW CREATION METHOD AND APPARATUS

CROSS-REFERENCE TO RELATED APPLICATIONS

This application is a U.S. National Stage Application of International Application No. PCT/CN2022/078306 filed Feb. 28, 2022, which designates the United States of America, the contents of which are hereby incorporated by reference in their entirety.

TECHNICAL FIELD

Teachings of the present disclosure relate to industry. Various embodiments include workflow creation methods and/or apparatus.

BACKGROUND

A workflow may be simply defined as a description of a series of operation processes. Workflows are widely used in automated systems, artificial intelligence, robots and other fields. For example, a workflow of a product sorting line in an automated system may be simply defined as start-up, photography, classification, and moving a product to a target position. A model deployment workflow in the field of artificial intelligence may be described as data collection, data marking, model training and model deployment.

Programmers who work in machine learning are more familiar with the creation of workflows using behavior tree models, whereas conventional OT (operational technology) engineers tend to edit and view workflows in event-based functional blocks. Workflows formed by behavior tree models or functional block models can respectively control corresponding execution engines to perform specific operations; however, behavior tree models and functional block models belong to two different systems, so at the present time, if it is necessary for the execution engines respectively corresponding to the two types of model to cooperate, the only option is to convert one type of model to the other type, and then completely integrate it with the other type of model, but this method is very time-consuming and complicated.

SUMMARY

Various embodiments of the present disclosure include workflow creation methods and apparatus, a platform, and a computer-readable medium, engaging the problem of behavior tree models and functional block models being unable to directly cooperate.

As an example, some embodiments include a workflow creation method comprising: receiving an operation, performed by a user on a graphical user interface, of constructing a functional block model; receiving an operation, performed by the user on the graphical user interface, of nesting a behavior tree into a second functional block in the functional block model, wherein the behavior tree is used to define an operation to be executed by a first workcell, and the functional block model is used to define an operation to be executed by a second workcell; in response to an operation performed by the user on the graphical user interface, a first functional block in the functional block model triggering an input event of the second functional block, then the second functional block triggering an execution signal to a root node in the behavior tree at a preset frequency, so that the behavior tree starts execution from the root node and outputs an execution result; the second functional block triggering a corresponding output event according to the execution generating an instance of the functional block model.

As an example, some embodiments include a workflow creation method comprising: receiving an operation, performed by a user on a graphical user interface, of constructing a behavior tree; receiving an operation, performed by the user on the graphical user interface, of nesting a functional block model into a first leaf node in the behavior tree, wherein the functional block model is used to define an operation to be executed by a first workcell, and the behavior tree is used to define an operation to be executed by a second workcell; in response to an operation performed by the user on the graphical user interface, triggering, at a parent node connected to the first leaf node, a first execution signal to the first leaf node, and the first leaf node triggering a start event to start execution of the functional block model; controlling execution of the functional block model in the first leaf node, according to the status of triggering of the first leaf node by the parent node within one propagation cycle of an execution signal of the behavior tree; after the first leaf node outputs an execution result, the first leaf node triggering a corresponding output event to the parent node according to the execution result; generating an instance of the behavior tree.

As an example, some embodiments include a workflow creation apparatus comprising component parts for performing one or more of the methods described herein.

As an example, some embodiments include a workflow creation comprising component parts for performing one or more of the methods described herein.

As an example, some embodiments include a workflow creation platform comprising: at least one memory, configured to store computer-readable code; at least one processor, configured to call the computer-readable code, to perform one or more of the methods described herein.

As an example, some embodiments include a computer-readable medium is provided, storing computer-readable instructions which, when executed by a processor, cause the processor to perform one or more of the methods described herein.

The example embodiments described herein may be used to integrate a behavior tree model and a functional block model in the same workflow quickly and conveniently.

BRIEF DESCRIPTION OF THE DRAWINGS

The drawings below are merely intended to illustrate and explain example embodiments of the present disclosure schematically, without limiting the scope thereof. In the drawings.

BRIEF DESCRIPTION OF THE DRAWINGS

Figure 1:
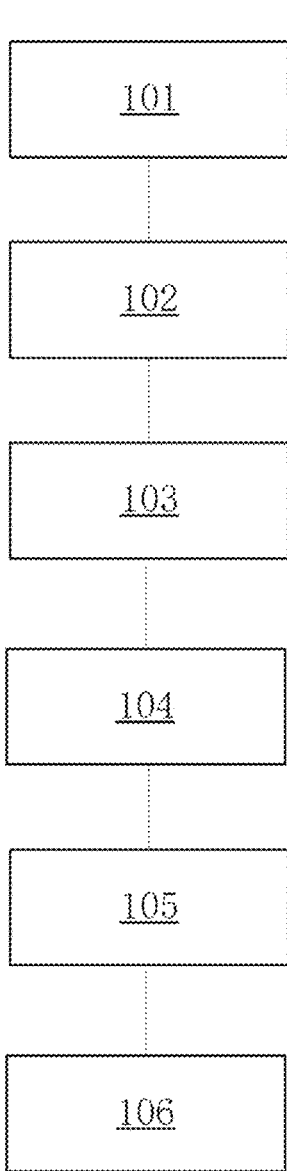
FIG. 1 is a flow chart of an example workflow creation method incorporating teachings of the present disclosure.

100: workflow creation method
101-104: method steps
300: workflow creation method
301-304: method steps
50: workflow creation apparatus
51: graphical interface module
52: editing/processing module
60: workflow creation apparatus
61: graphical interface module
62: editing/processing module
700: information processing platform
701: memory
702: processor

DETAILED DESCRIPTION

The subject matter described herein is now discussed with reference to exemplary embodiments. The sole purpose of discussing these embodiments is to enable those skilled in the art to better understand and thereby implement the subject matter described herein, without limiting the protection scope, applicability, or examples expounded in the claims. Changes may be made to the functions and arrangement of the discussed elements without departing from the scope of protection of the content of embodiments of the present application. Various processes or components may be omitted from, replaced in or added to various examples as required. For example, the described method may be performed in a different order to that described, and various steps may be added, omitted or combined. Furthermore, features described in relation to some examples may also be combined in other examples.

As used herein, the term "comprising" and variants thereof denote open terms meaning "including but not limited to". The term "based on" means "at least partly based on". The terms "one embodiment" and "an embodiment" mean "at least one embodiment". The term "another embodiment" means "at least one other embodiment". The terms "first", "second", etc. may denote different or identical objects. Other definitions may be included below, whether explicit or implicit. Unless clearly specified in the context, the definition of a term is the same throughout the description.

Low code may comprise computer software which may be deployed on an IPC (industrial computer) or SBC (single-board computer); low code provides a graphical user interface (GUI), allowing users to perform low-code development in the OT domain and/or the IT domain.

A workcell may be a system or equipment combination capable of realizing a relatively complete and independent control process and operation. In embodiments of the present application, workflows are created with workcells as the basic unit; this is more in keeping with the characteristics of industrial control, and can increase development integration while reducing development complexity. For example, taking the technical field of industry as an example, workcells may be defined according to the actual industrial scenario, e.g. one process may be defined to correspond to one workcell, or one workstation in a process may be defined as one workcell, or one machine in a workstation may be defined to correspond to one workcell, etc., with different workcells having different process flows.

A behavior tree is a type of formalized graphical modeling language, using clearly defined symbols to clearly represent hundreds or even thousands of natural language requests, and is a tree structure containing logic nodes and behavior nodes.

FIG. 1 is a flow chart of an example workflow creation method incorporating teachings of the present disclosure. As shown in FIG. 1, Step 101 may include receiving an operation, performed by a user on a graphical user interface, of constructing a functional block model.

Figure 2A:
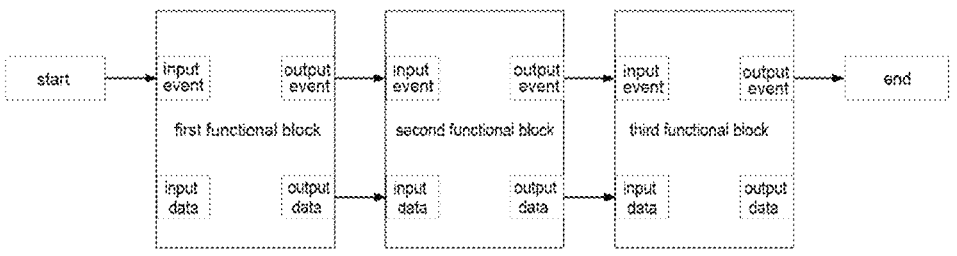
FIG. 2A is a schematic drawing of an example functional block model constructed in an embodiment incorporating teachings of the present disclosure.

As shown in FIG. 2A, the user may construct a functional block model on the graphical user interface, the functional block model comprising multiple functional blocks, and further comprising control nodes, e.g. a start node and an end node, at two ends of the functional block model. Each functional block is used to define an operation to be realized by a physical device in a workcell.

A functional block comprises an input event, an output event, input data and output data. Different functional blocks are connected to each other in sequence; the output event of a first functional block is connected to the input event of a second functional block, and output data of the first functional block is connected to input data of the second functional block. In some embodiments, the input event of a functional block may comprise a start event, and the output event of a functional block may comprise a success event and a failure event.

Figure 2B:
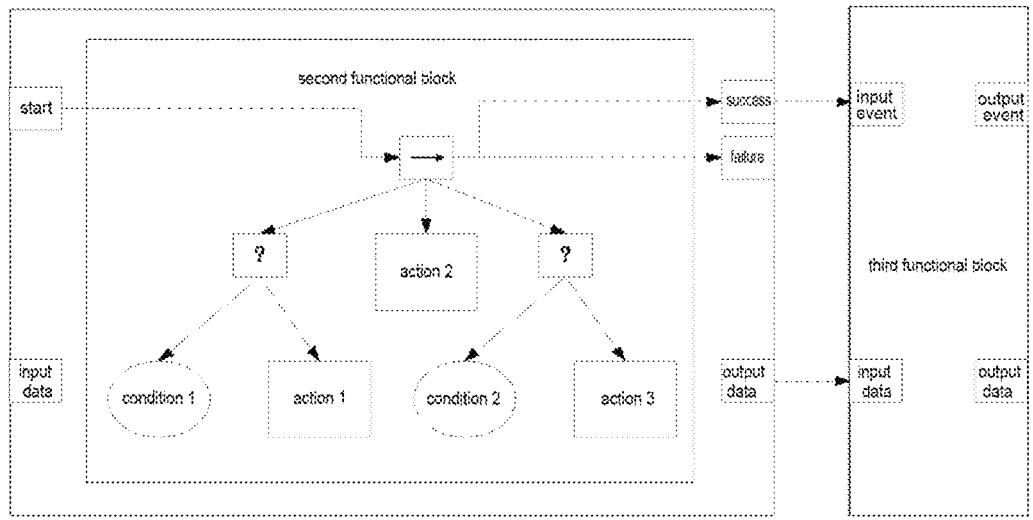
FIG. 2B is a schematic drawing of an example behavior tree nested into a functional block model in an embodiment incorporating teachings of the present disclosure.

Step 102 may include receiving an operation, performed by the user on the graphical user interface, of nesting a behavior tree into the second functional block in the functional block model. The behavior tree is used to define an operation to be executed by a first workcell. The functional block model is used to define an operation to be executed by a second workcell. As shown in FIG. 2B, the user may nest a behavior tree into the second functional block in the functional block model.

Step 103 may include, in response to an operation performed by the user on the graphical user interface, the first functional block in the functional block model triggering the input event of the second functional block.

Step 104 may include the second functional block triggering an execution signal to a root node in the behavior tree at a preset frequency, so that the behavior tree starts execution from the root node and outputs an execution result. If the root node returns not an execution result but an execution state indicating "running", the second functional block continues triggering an execution signal to the root node in the behavior tree, until the root node returns an execution result.

Step 105 may include the second functional block triggering a corresponding output event according to the execution result. If the execution result is "success", the second functional block triggers an output event representing success to a third functional block connected to the second functional block. If the execution result is "failure", the second functional block triggers an output event representing failure to an execution engine connected to the first workcell.

Step 106 may include generating an instance of the functional block model. In some embodiments, when the behavior tree is nested into the second functional block in the functional block model, data accessible by the behavior tree comprises data outputted by the first functional block connected to the second functional block.

After generating the instance of the functional block model, the instance of the functional block model is parsed, and a workflow corresponding to the functional block model is deployed on an execution engine controlling the second workcell, so that the second workcell connected to the execution engine executes an operation according to the workflow of the functional block model. The behavior tree is used to define an operation to be executed by a corresponding workcell; therefore, when the second functional block triggers an output event representing success to the third functional block, this means that a workflow corresponding to a behavior tree instance has been deployed on an execution engine controlling the first workcell, so that the first workcell connected to this execution engine executes an operation according to a workflow of the behavior tree. Optionally, the execution engine may be runtime.

In some embodiments, the execution engine corresponding to the behavior tree instance and the execution engine corresponding to the functional block model instance may be distributed in different places or integrated in a single host computer. Thus, the operation to be executed by the first workcell defined by the behavior tree and the operation to be executed by the second workcell defined by the functional block model may be executed in the same workflow, so that the execution engines respectively corresponding to the two operations cooperate under the control of the same workflow.

Combining the behavior tree and the functional block model directly is not only very convenient and fast but can also exploit their respective advantages in terms of modeling for different scenarios, as well as facilitating cooperation between OT engineers and machine learning programmers to control different workcells.

Figure 3:
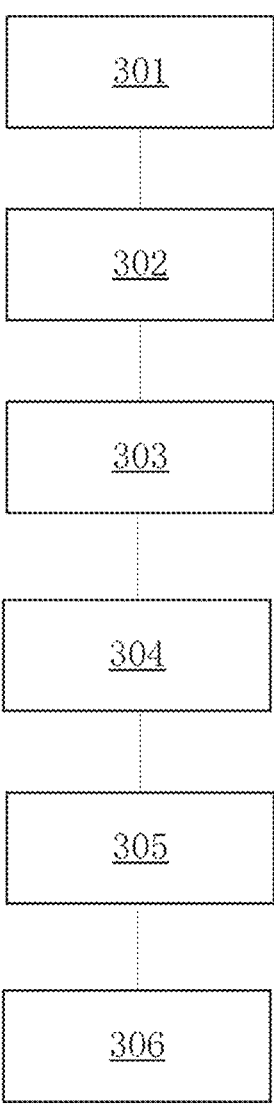
FIG. 3 is a flow chart of an example workflow creation method incorporating teachings of the present disclosure.

FIG. 3 is a flow chart of another workflow creation method incorporating teachings of the present disclosure. As shown in FIG. 3, Step 301 may include receiving an operation, performed by a user on a graphical user interface, of constructing a behavior tree.

Figure 4A:
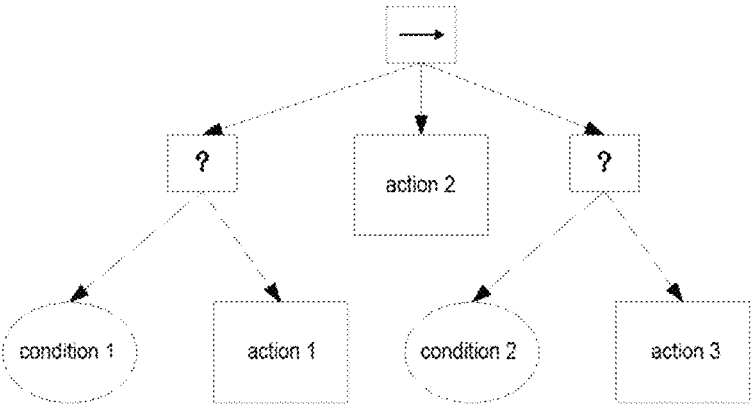
FIG. 4A is a schematic drawing of an example behavior tree constructed in an embodiment incorporating teachings of the present disclosure.
Figure 4B:
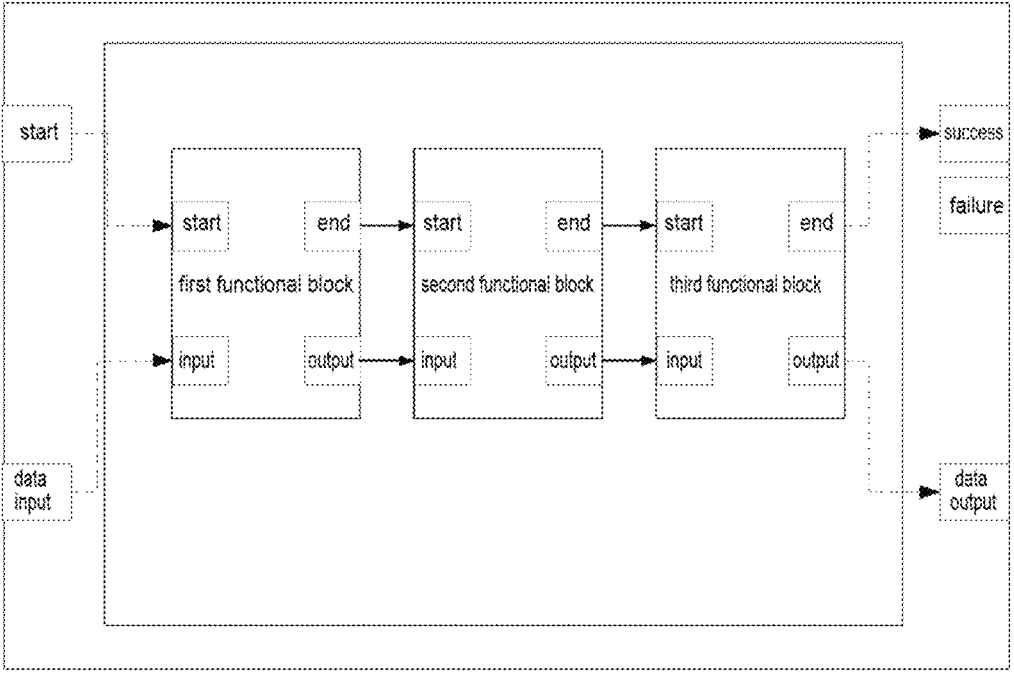
FIG. 4B is a schematic drawing of an example functional block model nested into a behavior tree in an embodiment incorporating teachings of the present disclosure.

As shown in FIG. 4A, the user may construct the behavior tree on the graphical user interface. Step 302 may include receiving an operation, performed by the user on the graphical user interface, of nesting the functional block model into a first leaf node in the behavior tree. The functional block model is used to define an operation to be executed by a first workcell. The behavior tree is used to define an operation to be executed by a second workcell.

As shown in FIG. 2B, the user may nest a functional block model composed of multiple functional blocks into the first leaf node in the behavior tree.

Step 303 may include, in response to an operation performed by the user on the graphical user interface, triggering, at a parent node connected to the first leaf node, a first execution signal to the first leaf node, and the first leaf node triggering a start event to start execution of the functional block model.

Step 304 may include controlling execution of the functional block model in the first leaf node, according to the status of triggering of the first leaf node by the parent node within one propagation cycle of an execution signal of the behavior tree. In some embodiments, when the parent node does not trigger an execution signal to the first leaf node within one propagation cycle of an execution signal of the behavior tree, the functional block model in the first leaf node pauses execution, until the first leaf node has an execution signal triggered by the parent node again, and the functional block model continues execution.

Execution/pausing of execution of the functional block model in the first leaf node is controlled according to the status of triggering/not triggering the first leaf node by the parent node within one propagation cycle of an execution signal of the behavior tree. In other words, the workflow in the functional block model in the first leaf node continues to be executed only when the first leaf node has an execution signal triggered, and the first leaf node returns a "running" execution state to the parent node. When execution of the workflow in the functional block model in the first leaf node is paused, an execution engine corresponding to the behavior tree sends a pause signal to an execution engine corresponding to the functional block model in the first leaf node.

In some embodiments, after the functional block model in the first leaf node pauses execution, information of a first functional block currently paused in the workflow is saved, and when triggered with an execution signal by the parent node again, the functional block model starts to continue execution from the first functional block. A memory function of the functional block model is thus added.

Step 305 may include, after the first leaf node outputs an execution result, the first leaf node triggering a corresponding output event to the parent node according to the execution result.

Step 306 may include generating an instance of the behavior tree. In some embodiments, when the functional block model is nested into the first leaf node in the behavior tree, data accessible by a third functional block in the functional block model in the first leaf node comprises: data outputted by a second functional block connected to the third functional block, and data of the behavior tree. Data of the behavior tree may comprise: global data/partial data of the behavior tree. The term "third functional block" does not specifically mean one particular functional block in the functional block model; it may denote any one of the functional blocks, or each of the functional blocks in the functional block model. The range of data accessible by the functional block model can thus be expanded.

Through embodiments of the present application, an operation to be executed by the first workcell defined by the functional block model and an operation to be executed by the second workcell defined by the behavior tree may be executed in the same workflow, so that the execution engines respectively corresponding to the two operations cooperate under the control of the same workflow.

In some embodiments, by combining the responsive method of nesting a behavior tree into a functional block in a functional block model with the responsive method of nesting a functional block model into a leaf node in a behavior tree, inter-nesting may be performed multiple times. For example, a first behavior tree may be nested into a first functional block in a first functional block model, then a second functional block model may be nested into a first leaf node in the first behavior tree, and depending on actual circumstances, inter-nesting modes may continue to be added, so as to achieve a greater variety of possibilities.

Figure 5:
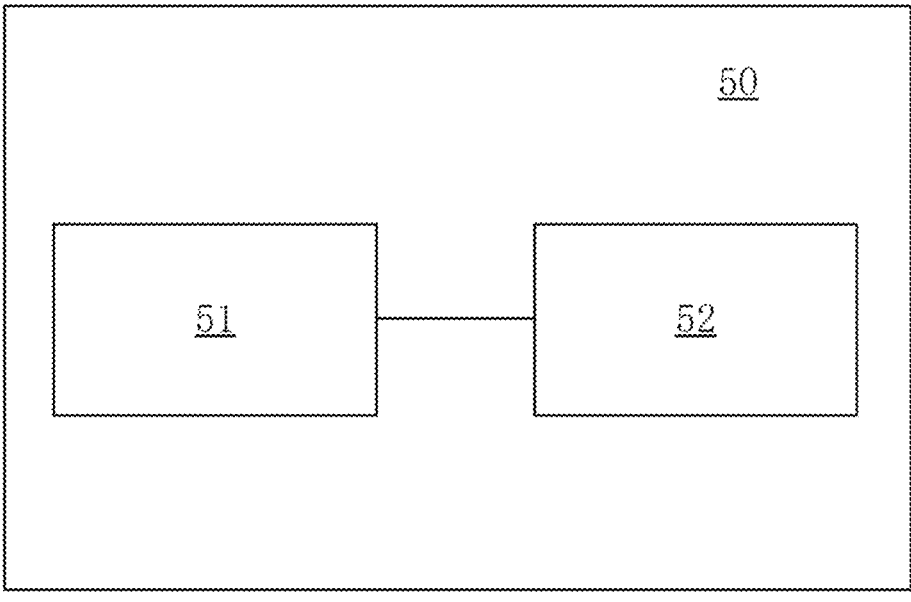
FIG. 5 is a schematic drawing of an example workflow creation apparatus incorporating teachings of the present disclosure.

FIG. 5 is a schematic drawing of an example workflow creation apparatus incorporating teachings of the present application. As shown in FIG. 5, the workflow creation apparatus may comprise a graphical interface module 51, configured to provide a graphical user interface for a user to perform an operation of constructing a functional block model and an operation of nesting a behavior tree into a second functional block in the functional block model. The behavior tree is used to define an operation to be executed by a first workcell. A workflow is used to define an operation to be executed by a second workcell.

The apparatus may include an editing/processing module 52, configured such that: after a first functional block in the functional block model triggers an input event of the second functional block, in response to an operation performed by the user on the graphical user interface, the second functional block triggers an execution signal to a root node in the behavior tree at a preset frequency, so that the behavior tree starts execution from the root node and outputs an execution result. The second functional block triggers a corresponding output event according to the execution result. An instance of the functional block model is generated.

Figure 6:
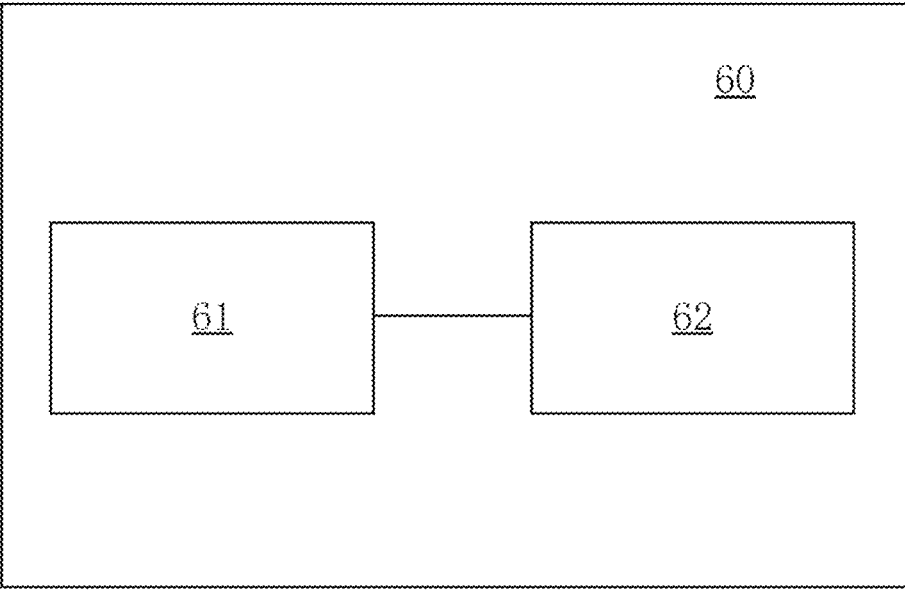
FIG. 6 is a schematic drawing of an example workflow creation apparatus incorporating teachings of the present disclosure.

FIG. 6 is a schematic drawing of another workflow creation apparatus incorporating teachings of the present disclosure. As shown in FIG. 6, the workflow creation apparatus comprises a graphical interface module 61, configured to: provide a graphical user interface for a user to perform an operation of constructing a behavior tree and an operation of nesting a functional block model into a first leaf node in the behavior tree. The functional block model is used to define an operation to be executed by a first workcell. The behavior tree is used to define an operation to be executed by a second workcell.

The apparatus may include an editing/processing module 62, configured such that: in response to an operation performed by the user on the graphical user interface, a first execution signal is triggered to the first leaf node, at a parent node connected to the first leaf node, and the first leaf node triggers a start event to start execution of the functional block model, then execution of the functional block model in the first leaf node is controlled according to the status of triggering of the first leaf node by the parent node within one propagation cycle of an execution signal of the behavior tree. After the first leaf node outputs an execution result, the first leaf node triggers a corresponding output event to the parent node according to the execution result. An instance of the behavior tree is generated.

Figure 7:
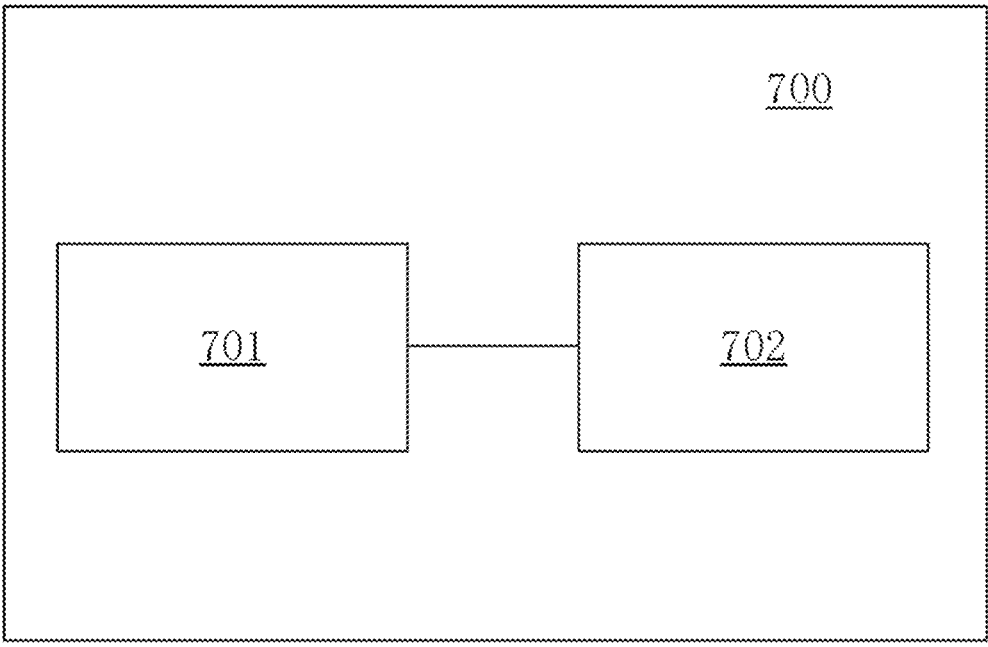
FIG. 7 is a schematic drawing of an example workflow creation platform incorporating teachings of the present disclosure.

Some embodiments include a workflow creation platform 700. FIG. 7 is a schematic drawing of a workflow creation platform 700 incorporating teachings of the present disclosure. As shown in FIG. 7, the workflow creation platform 700 comprises a processor 702 and a memory 701, the memory 701 storing instructions which, when executed by the processor 702, execute one of the methods described herein.

The at least one processor 702 may comprise a microprocessor, an application-specific integrated circuit (ASIC), a digital signal processor (DSP), a central processing unit (CPU), a graphical processing unit (GPU), a state machine, etc. Embodiments of computer-readable media include but are not limited to floppy disks, CD-ROM, magnetic disks, memory chips, ROM, RAM, ASIC, configured processors, fully optical media, all magnetic tapes or other magnetic media, or any other media from which instructions can be read by a computer processor.

In some embodiments, various other forms of computer-readable media can send or carry instructions to a computer, including routers, private or public networks, or other wired and wireless transmission devices or channels. The instructions may comprise code in any computer programming language, including C, C++, C language, Visual Basic, java and JavaScript.

In addition, embodiments of the present application further provide a computer-readable medium, having stored thereon computer-readable instructions which, when executed by a processor, cause the processor to perform the OT domain low-code development method described above. Embodiments of computer-readable media include floppy disks, hard disks, magneto-optical disks, optical disks (e.g. CD-ROM, CD-R, CD-RW, DVD-ROM, DVD-RAM, DVD-RW, DVD+RW), magnetic tape, non-volatile memory cards and ROM. Optionally, computer-readable instructions may be downloaded from a server computer or the cloud via a communication network.

Not all of the elements in the procedures and systems described above are necessary; certain steps or modules may be omitted. The order the steps are performed is not fixed. The system structures described in the embodiments above may be physical structures or logic structures, e.g. some modules might be realized by the same physical entity, or some modules might be realized by multiple physical entities separately or may be realized jointly by certain components in multiple independent devices.

What is claimed is:

1. A workflow creation method comprising:

receiving a first operation performed by a user on a graphical user interface (GUI) constructing a behavior tree;

receiving a second operation performed by the user on the GUI nesting a functional block model into a first leaf node in the behavior tree, wherein the functional block model defines a third operation to be executed by a first workcell, and the behavior tree defines a fourth operation to be executed by a second workcell;

in response to a fifth operation performed by the user on the GUI, trigger, at a parent node connected to the first leaf node, a first execution signal to the first leaf node, and the first leaf node triggers a start event to start execution of the functional block model;

controlling execution of the functional block model in the first leaf node, according to a status of the first leaf node by the parent node within one propagation cycle of a second execution signal of the behavior tree;

after the first leaf node outputs an execution result, the first leaf node triggers a corresponding output event to the parent node according to the execution result;

generating an instance of the behavior tree;

wherein controlling execution of the functional block model in the first leaf node, according to the status of triggering of the first leaf node by the parent node within one propagation cycle of a third execution signal of the behavior tree, comprises:

when the parent node does not trigger a fourth execution signal to the first leaf node within one propagation cycle of an execution signal of the behavior tree, the functional block a model in the first leaf node pauses execution, until the first leaf node is triggered with a fifth execution signal by the parent node again, and the functional block model continues execution;

controlling execution/pausing of execution of the functional block model in the first leaf node according to status of triggering/not triggering the first leaf node by the parent node within one propagation cycle of an execution signal of the behavior tree.

2. The method as claimed in claim 1, further comprising, after the functional block model in the first leaf node pauses execution, saving information of a first functional block currently paused, and when triggered with a sixth execution signal by the parent node again, the functional block model starting to continue execution from the first functional block.

3. The method as claimed in claim 1, further comprising, when the functional block model is nested into the first leaf node in the behavior tree, data accessible by a third functional block in the functional block model in the first leaf node comprises: data outputted by a second functional block connected to the third functional block, and data of the behavior tree.

4. A workflow creation apparatus comprising: a graphical user interface (GUI) allowing a user to perform a first operation of constructing a functional block model and a second operation of nesting a behavior tree into a second functional block in the functional block model, wherein the behavior tree is used to define a third operation to be executed by a first workcell, and a workflow is used to define a fourth operation to be executed by a second workcell;

at least one processor programmed to:

receive a fifth operation performed by the user on the GUI constructing a behavior tree;

receive a sixth operation performed by the user on the GUI nesting a functional block model into a first leaf node in the behavior tree, wherein the functional block model defines a seventh operation to be executed by a first workcell and the behavior tree defines a eighth operation to be executed by a second workcell;

in response to a ninth operation performed by the user on the GUI, trigger, at a parent node connected to the first leaf node, a first execution signal to the first leaf node, and the first leaf node triggers a start event to start execution of the functional block model;

control execution of the functional block model in the first leaf node, according to a status of the first leaf node by the parent node within one propagation cycle of a second execution signal of the behavior tree;

after the first leaf node outputs an execution result, the first leaf node triggers a corresponding output event to the parent node according to the execution result;

generate an instance of the behavior tree;

wherein controlling execution of the functional block model in the first leaf node, according to a status of triggering of the first leaf node by the parent node within one propagation cycle of third execution signal of the behavior tree, comprises:

when the parent node does not trigger a fourth execution signal to the first leaf node within one propagation cycle of an execution signal of the behavior tree, the functional block model in the first leaf node pauses execution, until the first leaf node is triggered with a fifth execution signal by the parent node again, and the functional block model continues execution; and the at least one processor is further programmed to control execution/pausing of execution of the functional block model in the first leaf node according to the status of triggering/not triggering the first leaf node by the parent node within one propagation cycle of an execution signal of the behavior tree.

\* \* \* \* \*